United States Patent
Stevovich (10) Patent No.: US 8,117,944 B2
(45) Date of Patent: Feb. 21, 2012

(54) PEDAL APPARATUS

(76) Inventor: Nikola Stevovich, Rocky River, OH (US)

(*) Notice: Subject to any disclaimer, the term of this patent is extended or adjusted under 35 U.S.C. 154(b) by 1079 days.

(21) Appl. No.: 11/971,555

(22) Filed: Jan. 9, 2008

(65) Prior Publication Data
US 2008/0163721 A1 Jul. 10, 2008

Related U.S. Application Data

(60) Provisional application No. 60/884,031, filed on Jan. 9, 2007.

(51) Int. Cl.
*B62M 3/08* (2006.01)
(52) U.S. Cl. ........ 74/594.4; 74/594.3; 74/594.7
(58) Field of Classification Search ........ 74/512, 74/560, 594.1, 594.3, 594.4, 594.7
See application file for complete search history.

(56) References Cited

U.S. PATENT DOCUMENTS

| | | | |
|---|---|---|---|
| 1,509,793 A | 9/1924 | Thompson | |
| 2,749,771 A * | 6/1956 | Pearl | 74/594.4 |
| 3,260,289 A | 7/1966 | Whitten, Jr. | |
| 3,596,525 A | 8/1971 | Niesz | |
| 4,193,324 A | 3/1980 | Marc | |
| 4,648,287 A * | 3/1987 | Preskitt | 74/594.1 |
| 5,172,926 A | 12/1992 | Mannino | |
| 5,199,324 A | 4/1993 | Sain | |
| 5,433,680 A | 7/1995 | Knudsen | |
| 5,449,332 A | 9/1995 | Hervig | |
| 5,634,382 A | 6/1997 | Fan | |
| 5,676,497 A | 10/1997 | Kim | |
| 6,745,643 B2 * | 6/2004 | Lubanski | 74/594.6 |
| 6,783,139 B1 * | 8/2004 | Wang et al. | 280/237 |
| 7,918,768 B2 * | 4/2011 | Rogozinski | 482/57 |
| 2004/0004341 A1 * | 1/2004 | Carr et al. | 280/256 |
| 2007/0163380 A1 | 7/2007 | Chen | |
| 2009/0229405 A1 * | 9/2009 | White | 74/594.7 |

FOREIGN PATENT DOCUMENTS

| | | |
|---|---|---|
| DE | 4336183 A1 | 4/1994 |
| EP | 000031627 * | 12/1980 |
| WO | 9600679 A | 1/1996 |
| WO | 2005115826 A | 12/2005 |

OTHER PUBLICATIONS

International Search Report dated Jun. 17, 2008.

* cited by examiner

*Primary Examiner* — Richard W Ridley
*Assistant Examiner* — Terence Boes
(74) *Attorney, Agent, or Firm* — Pearne & Gordon LLP (57) ABSTRACT

In accordance with one aspect of the present invention, a pedal apparatus is provided. The pedal apparatus comprises a pedal member including a seat and an axle configured to cooperate with the seat to support the pedal member. The pedal apparatus is configured such that a rotation of the pedal member with respect to the axle causes translation of the pedal member with respect to the axle.

1 Claim, 11 Drawing Sheets

PEDAL APPARATUS

CROSS-REFERENCE TO RELATED APPLICATIONS

This application claims the benefit of U.S. Provisional Application No. 60/884,031, filed Jan. 9, 2007, the entire disclosure of which is hereby incorporated herein by reference.

FIELD OF THE INVENTION

The present invention relates generally to pedal apparatus, and more particularly, to pedal apparatus for inducing a pedal member configured to rotate and translate with respect to an axle.

BACKGROUND OF THE INVENTION

Conventional pedal apparatus are configured to rotate to allow power to be applied to a crankshaft to rotate a drive sprocket. The drive sprocket can be linked to a wheel by way of a drive chain. Such an arrangement is typically found on a bicycle. In use, an operator can apply force to the pedal apparatus in order to drive the rear wheel of the bicycle.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a pedal apparatus is provided. The pedal apparatus comprises a pedal member including a seat and an axle configured to cooperate with the seat to support the pedal member. The pedal apparatus is configured such that a rotation of the pedal member with respect to the axle causes translation of the pedal member with respect to the axle.

In accordance with another aspect of the present invention, a pedal apparatus is provided. The pedal apparatus comprises a pedal member including a bore, a cam shaft including a cam groove, and a cam follower. The cam shaft is at least partially received in the bore of the pedal member. The cam follower includes a portion attached to the pedal member. The cam follower also includes a cam extension received in the cam groove. Rotation of the pedal member with respect to the cam shaft causes the cam extension to move within the cam groove to guide translation of the pedal member with respect to the cam shaft between a first lateral position of the pedal member with respect to the cam shaft and a second lateral position of the pedal member with respect to the cam shaft.

BRIEF DESCRIPTION OF THE DRAWINGS

Aspects of the present invention will become apparent to those skilled in the art to which the present invention relates upon reading the following description with reference to the accompanying drawings, in which.

DESCRIPTION OF EXAMPLE EMBODIMENTS

Example embodiments that incorporate one or more aspects of the present invention are described and illustrated in the drawings. These illustrated examples are not intended to be a limitation on the present invention. For examples one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 1:
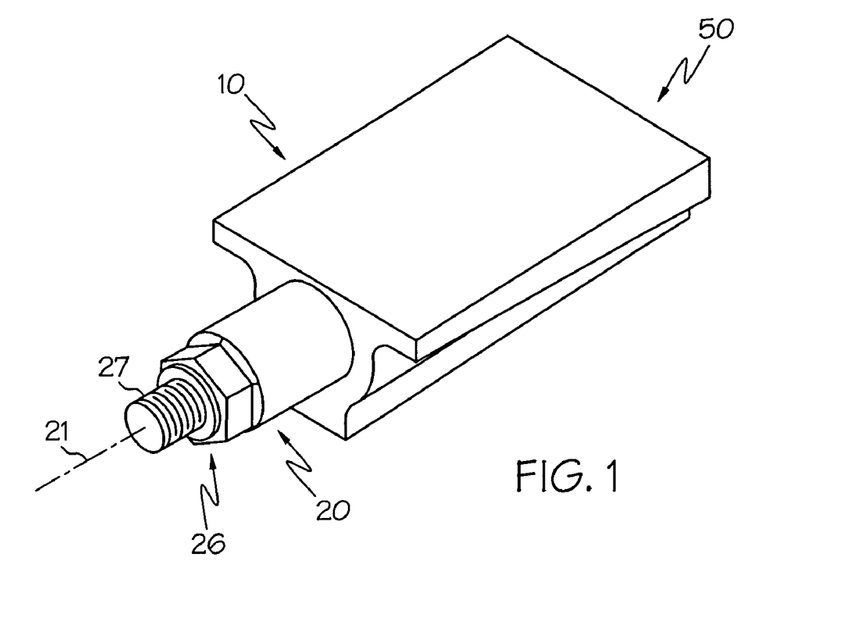
FIG. 1 is an upper front perspective view of an example pedal apparatus in accordance with aspects of the present invention with an axle and a pedal member oriented in a laterally extended position with respect to one another.

Turning to FIG. 1, a pedal apparatus 50 in accordance with aspects of the present invention is illustrated. Pedal apparatus in accordance with aspects of the present invention may be used in a wide variety of applications and configurations. For example, pedal apparatus can be incorporated as part of a vehicle (e.g., bicycle, tricycle) or other apparatus. In one example, the pedal apparatus may be incorporated into a bicycle for engagement by the feet of a rider. It is also contemplated that the pedal apparatus may be designed for use with the hands of a rider, such as part of a hand crank, Pedal apparatus can also be incorporated as part of a therapeutic device. Such therapeutic devices may be used for rehabilitation and/or exercising purposes. Some examples of therapeutic devices may comprise a stationary bicycle, recumbent bicycles, stair stepping machines, elliptical machines, climbing simulator, or other physical therapy machines that use a pedal-like motion for legs or arms.

Pedal apparatus in accordance with aspects of the present invention can be incorporated into a device at the time of an initial manufacture and/or may be used to retrofit an existing device to provide a pedal apparatus with lateral movement characteristics. For example, a bicycle may be originally produced with the pedal apparatus. Alternatively, the pedal apparatus may be purchased separately and used to retrofit an existing bicycle to provide the pedal apparatus with lateral movement characteristics.

Figure 2:
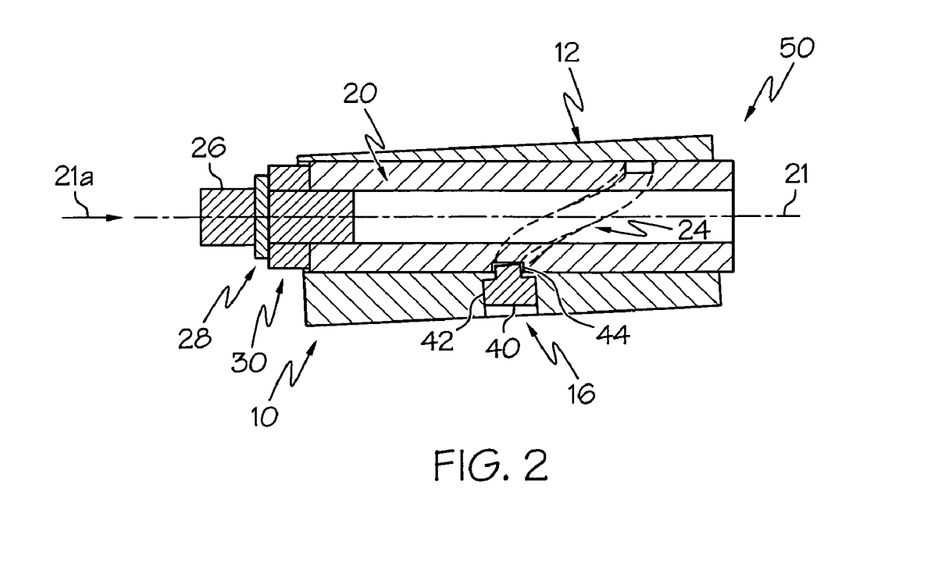
FIG. 2 is a sectional view of the pedal apparatus of FIG. 1 with the axle and the pedal member oriented in a laterally retracted position with respect to one another.

As shown in the example of FIGS. 1-2, the pedal apparatus 50 includes a pedal member 10 and an axle 20 mounted to the pedal member 10. The axle 20 is configured to support the pedal member 10. The axle 20, in one example, can be a cam shaft. A rotation, such as an infinite rotation, of the pedal member 10 with respect to the axle causes translation of the pedal member 10 with respect to the axle 20. The translation can be a linear or curved movement. In one example, the translation can comprise a lateral movement although translations may occur in other directions as well. For example, the translation can comprise lateral linear movements, lateral curved movements, or other translations. Still further, the translation can comprise a reciprocation movement between a first lateral position and a second lateral position.

Figure 3:
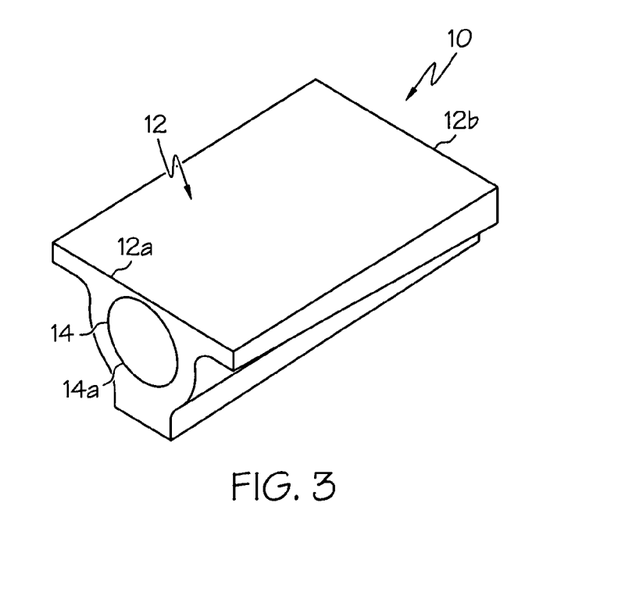
FIG. 3 is an upper front perspective view of the pedal member shown in FIG. 1.
Figure 4:
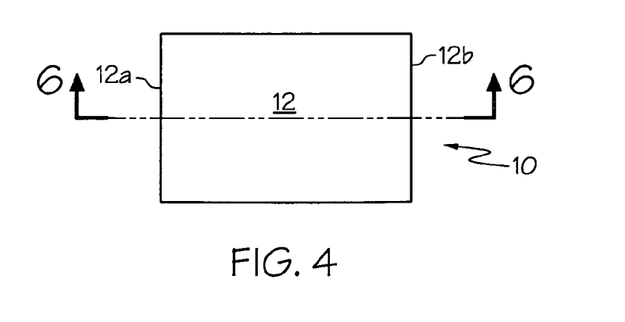
FIG. 4 is a top view of the pedal member of FIG. 3.

FIGS. 3-8 illustrate details of one example pedal member 10 that may be used in accordance with aspects of the present invention. As shown in FIG. 3, the pedal member 10 can include a seat to facilitate support of the pedal member by the axle. The seat can include a groove, a channel, or other structure that is configured to cooperate with an axle. In the illustrated example, the seat comprises a bore 14. A low friction material may be provided to reduce friction between the pedal member and the axle. For example, lubrication can be inserted into the through bore 14 to maintain a smooth connection between the through bore 14 and the axle 20. In addition, a drainage apparatus can be provided on the pedal member, in operable connection with the through bore 14, to release or drain excess lubrication from the system. In further examples, the low friction material can comprise a self-lubricating layer or material. Various components of the pedal apparatus can comprise a variety of materials. For example, the pedal member, axles, and/or other components can comprise titanium, a carbon composite, or other materials.

The pedal member 10 further includes an engagement surface 12, as seen in FIGS. 2-4, 6, 7, and 11A-11D. The engagement surface 12 can be configured to provide a press surface for a user. For example, the engagement surface 12 can be configured to be engaged by the shoe of a user. Although not shown, the engagement surface 12 may also be provided with a cage, clip, strap, structure to engage a shoe or a cleat on a shoe, and/or other configuration designed to grasp the foot and/or hand of a user. In other examples, the pedal member 10 can be configured to be easily graspable by a hand of the user.

Figure 6:
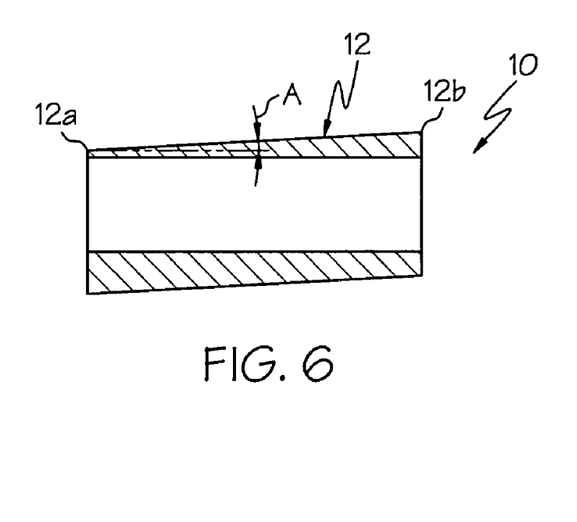
FIG. 6 is a sectional view of the pedal member along line 6-6 of FIG. 3.
Figure 7:
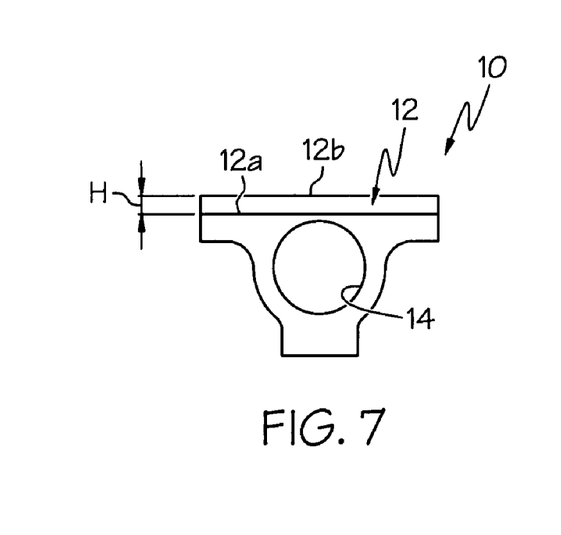
FIG. 7 is a front end view of the pedal member of FIG. 3.
Figure 8:
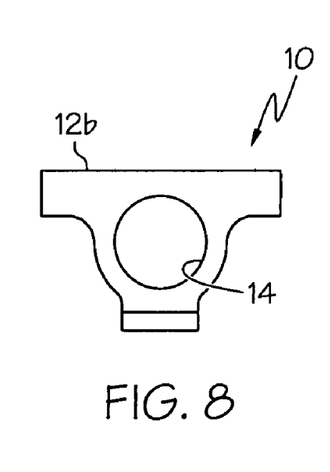
FIG. 8 is a rear end view of the pedal member of FIG. 3.

As shown in FIG. 2, the engagement surface 12 can be inclined in a direction 21a of the axle 20. For example, as shown in FIG. 6, the pedal member can be inclined at an angle "A" from the inner edge 12a to the outer edge 12b of the engagement surface 12. As shown in the front end view of FIG. 7, the outer edge 12b may be positioned at a vertical height "H" with respect to the inner edge 12a. If the engagement surface 12 is substantially planar, as shown in FIG. 6, the planar surface may be inclined upwardly at the angle "A" from the inner edge 12a to the outer edge 12b. Providing such an incline can be beneficial to encourage translation of the pedal member 10 with respect to the axle 20, such as a lateral outward movement of the pedal member 10 with respect to the axle 20 as discussed move fully below. In other examples, the engagement surface 12 is inclined from the outer edge 12b to the inner edge 12a. In further examples, the engagement surface 12 is not inclined with respect to either edge and can be substantially horizontal. In other examples, the pedal member 10 can be provided with structure to create a variable optimum inclined angle where a user of the apparatus can select a desired inclined angle of the pedal member 10.

Figure 9:
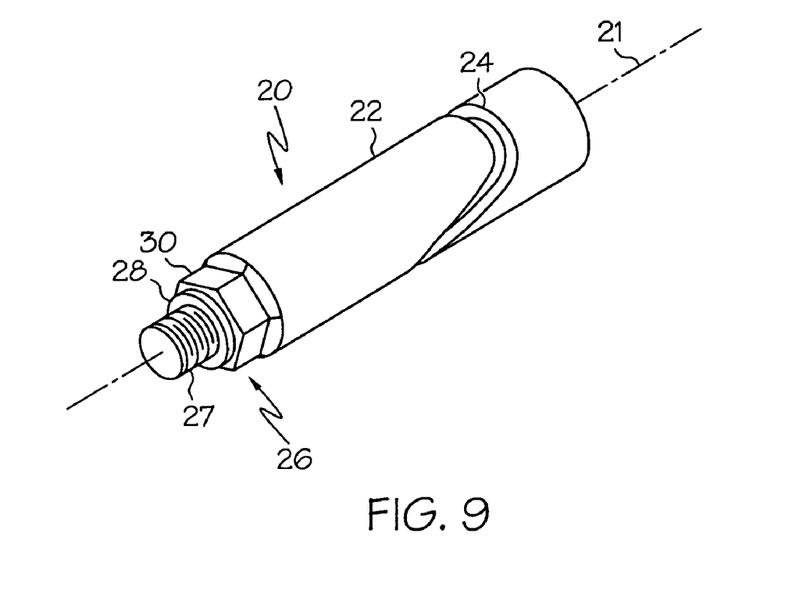
FIG. 9 is an upper front perspective view of the axle shown in FIG. 1.
Figure 10:
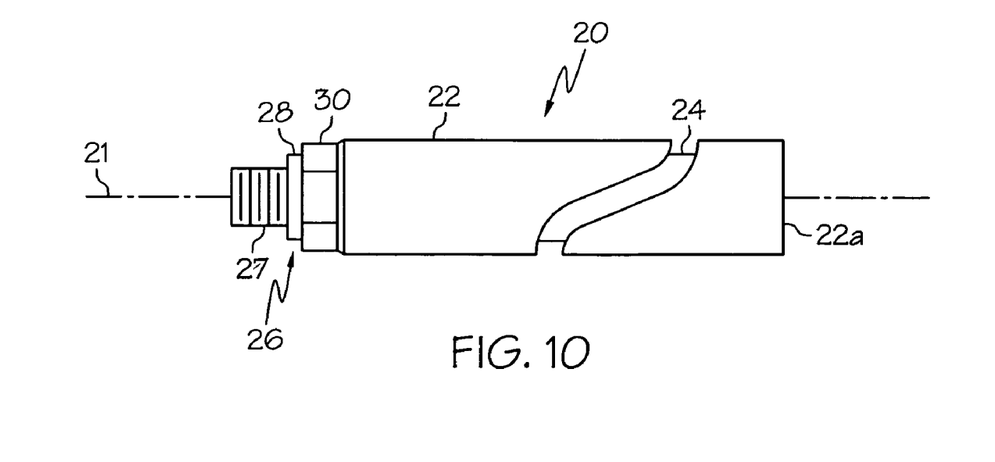
FIG. 10 is a side view of the axle of FIG. 9.

FIGS. 9 and 10 depict an example of the axle 20 in accordance with aspects of the present invention. As shown in FIG. 9, the axle 20 can include a cam tube 22 with a cam groove 24. The cam groove 24 can be configured to cause translation of the pedal member 10 with respect to the axle 20. In one example, the pedal member 10 can translate along an axis 21 of the axle 20. The cam groove 24 can define a closed groove path encircling an outer periphery of the cam tube 22. In other examples, the pedal member 10 can, in addition or alternatively, include a cam groove 24.

The axle 20 can further include a mounting device 26, as seen in FIG. 1. The mounting device 26 can be located at one end of the axle 20 and can be configured to secure the axle 20 to a drive apparatus 60, as seen in FIG. 11 and FIGS. 11A-11D. In one example, seen in FIG. 9 and FIG. 10, the mounting device 26 can optionally include a threaded shank with a threaded end 27 that is used to engage a crank shaft 62 of the drive apparatus 60. Other configurations and structure for the mounting device 26 also can be used with the subject invention. The mounting device 26 can be integral with the axle 20 or can be a separate component. If the mounting device 26 is a separate component, an optional nut 30 can be threadingly received on an outer surface of the mounting device 26 to lock the mounting device 26 with respect to the axle 20. An optional washer 28 can also be received over the end of the mounting device 26 and can act as a friction reducing bushing against a crank shaft 62 of the drive apparatus 60. As shown, the threaded end 27 can be inserted through an aperture of the crank shaft 62 and the nut 30 may be used to secure the pedal member 10 to the crank shaft 62. In further examples, the aperture of the crank shaft 62 may be threaded such that the threaded end 27 can be threaded into the threaded aperture of the crank shaft 62. Further attachment configurations and/or mounting devices may be incorporated in accordance with further examples of the present invention. The mounting device 26 can facilitate fitting the subject invention on any style of bike, exercise device, or other apparatus that includes a drive apparatus. For instance, a quick release device may be used to secure the pedal member to the crank shaft 62. In such an example, the pedal member 10 may be quickly installed and/or can be quickly switched between various alternative pedal member designs as desired. In other examples, a ratchet set can be used with the mounting device to quickly install the pedal member.

In FIG. 2, an assembled example of the pedal apparatus 50 is shown. To assemble the axle 20, the mounting device 26 can be threadingly received into a correspondingly threaded end portion of the cam tube 22. Next, the nut 30 can be threaded over the threaded end 27 of the mounting device 26 and tightened against the cam tube 22 to lock the position of the mounting device 26 with respect to the cam tube 22. Finally, the washer 28 can be inserted over an end of the mounting device 26 and shifted over to rest against the nut 30. As shown in FIG. 10, one example, a front end portion 22a of the cam tube 22 can be inserted into the inner portion 14a of the through bore 14, shown in FIG. 3. The cam groove 24 can be configured to receive a cam follower 40. As shown in FIG. 2, the cam groove 24 can be located on the axle 20 and the cam follower 40 can protrude from the pedal member 10 and into the cam groove 24. In another example, the cam groove can be located on the pedal member and the axle can include the cam follower. A portion of the cam follower 40 can be configured to engage the cam groove 24 to provide translation of the pedal member 10 with respect to the axle 20, such as translation between lateral positions. In another example, the cam follower can be provided with a ball-bearing at the end of the cam follower to engage the cam groove and thereby reduce friction.

Figure 5:
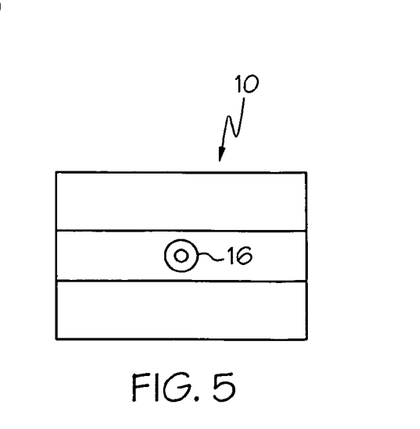
FIG. 5 is a bottom view of the pedal member of FIG. 3.

In a further example, the pedal member 10 can include an aperture 16, seen in FIG. 2. The cam follower 40 can be removably received in the aperture 16. In one example, the cam follower 40 can be threadedly received in a threaded aperture 16. FIG. 5 illustrates a bottom view of the pedal member 10 wherein, in one example, the aperture 16 comprises a countersunk aperture. As shown, the aperture 16 is configured to communicate with the bore 14 from a bottom area of the pedal member 10. In other examples, the aperture 16 can be located along other surfaces of the pedal member 10 and still communicate with the through bore 14. During assembly, the axle 20 can be rotated and translated relative to the pedal member 10 until the cam groove 24 is aligned with the aperture 16 of the pedal member 10. Alternatively, the pedal member 10 can be rotated and translated relative to the axle 20 until the cam groove 24 is aligned with the aperture 16 of the pedal member 10. The cam follower 40 can then be removably received in the aperture 16. A threaded base 42 of the cam follower 40 can be threadingly received within the aperture 16. The cam follower 40 can include a cam extension 44 that can be received within the cam groove 24 of the axle 20. Once appropriately assembled, the cam follower 40 is effective to movably connect the pedal member 10 to the axle 20. The rotation of the pedal member 10 with respect to the axle 20 causes the cam extension 44 to move within the cam groove 24 to guide translation of the pedal member 10 with respect to the axle 20 between a first lateral position of the pedal member 10 with respect to the axle 20 and a second lateral position of the pedal member with respect to the axle 20. The cam extension 44 can include structure configured to reduce friction between the cam follower 40 and the cam groove 24. For example, the cam extension can be self-lubricating and/or can be provided with a layer of friction reducing material. In a further example, the cam extension can be provided with one or more rollers or ball bearings to reduce friction. Alternatively, a gearing structure or other mechanical configuration can be used in place of the cam follower 40 to create a translation of the pedal member 10 with respect to the axle 20.

The pedal member 10 may also translate, in a reciprocating manner along the axis 21 between a first lateral position and a second lateral position. Indeed, the rotation of the pedal member 10 with respect to the axle 20 can cause reciprocation of the pedal member 10 with respect to the axle 20 between the first lateral position of the pedal member 10 with respect to the axle 20 and the second lateral position of the pedal member 10 with respect to the axle 20. The first lateral position can be a fully retracted position and the second lateral position can be a fully extended position.

As discussed above, in one example, the pedal apparatus 50 may be purchased separately and a user may retrofit an existing device to include the pedal apparatus 50. For example, a user may remove one or both of the pedals and install the pedal apparatus 50 on each side of the crank shaft 62 typically associated with a drive member 64 of the drive apparatus 60 of a bicycle. It is appreciated that the pedal apparatus 50 may be formed as mirror images or one another to accommodate each end of the crank shaft 62. Thus, the engagement surfaces 12 of the pedal members 10 may be appropriately inclined upwardly for engagement by each foot of a rider of the bicycle. Once the existing pedals are removed, a threaded end 27 of the mounting device 26 can be used to engage a correspondingly threaded aperture at the end of the crank shaft 62 of the drive apparatus 60 (see FIG. 11).

Operation of the pedal apparatus 50 with respect to the drive apparatus 60 is illustrated in FIGS. 11 and 11A-11D. The drive apparatus 60 includes a crank shaft 62. The mounting device 26 of the pedal apparatus 50 can be operably connected a first end 63a of the crank shaft 62. The crank shaft 62 can also be operably connected to the drive member 64 at a second end 63b of the crank shaft 62. The drive member 64 can then be configured to rotate about a rotation axis 66 by applying a force to the pedal apparatus 50. The drive member 64 can comprise a rotatable element such as a drive sprocket, a friction wheel, or other types of rotatable elements. In one example, the drive member can comprise a sprocket configured to drive a drive chain. In another example, the drive member can comprise a friction wheel configured to engage a friction belt. It will be appreciated that rotation of the crank shaft 62 by way of the pedal apparatus 50 can also result in a corresponding rotation of a drive member 64.

Figure 11:
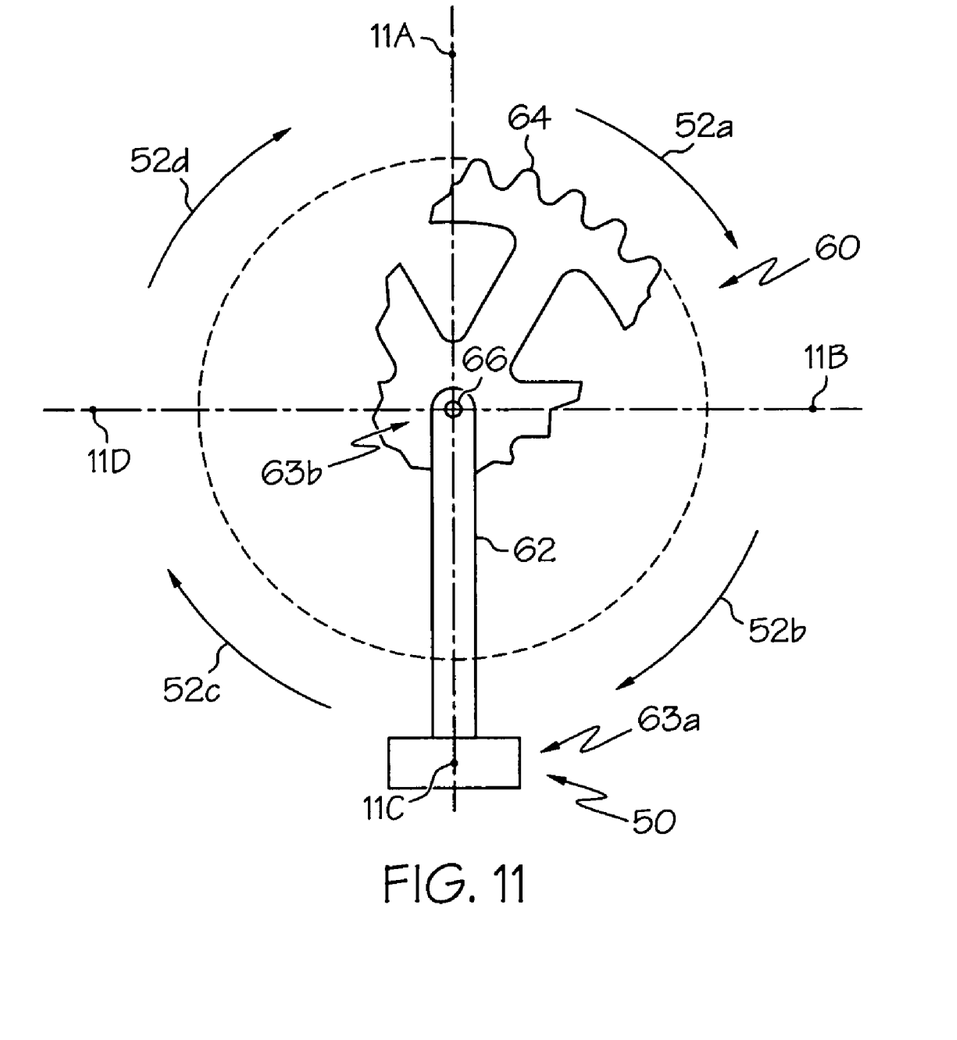
FIG. 11 is a schematic illustration of an example pedal apparatus including a crank shaft attached to a drive member and an axle attaching a pedal member to the crank shaft.
Figure 11A:
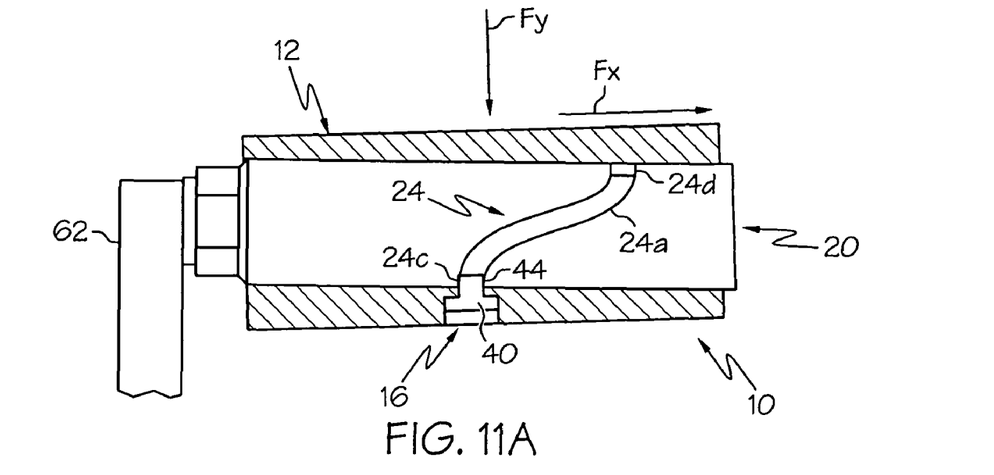
FIG. 11A is a schematic partial sectional view of the pedal apparatus, wherein the axle and the pedal member are oriented in a fully laterally retracted position with respect to one another.

FIG. 11 illustrates the pedal apparatus being used to rotate the drive member 64 360° about the rotation axis 66. In one example, the schematic partial sectional views of the pedal apparatus 50 shown in FIGS. 11A-11D correspond, respectively to positions 11A-11D shown in FIG. 11. For example, FIG. 11A illustrates a schematic sectional view of the pedal apparatus 50 in position 11A in FIG. 11. In this example, the axle 20 and the pedal member 10 oriented in a fully retracted position with respect to one another. From this position, an operator (e.g. a bicycle rider, stationary bike rider, or the like) may press against the engagement surface 12 and apply downward vertical force $F_y$ and a lateral side force $F_x$. The resulting force will cause the pedal apparatus 50 to rotate along direction 52a from position 11A to position 11B as shown in FIG. 11.

Figure 11B:
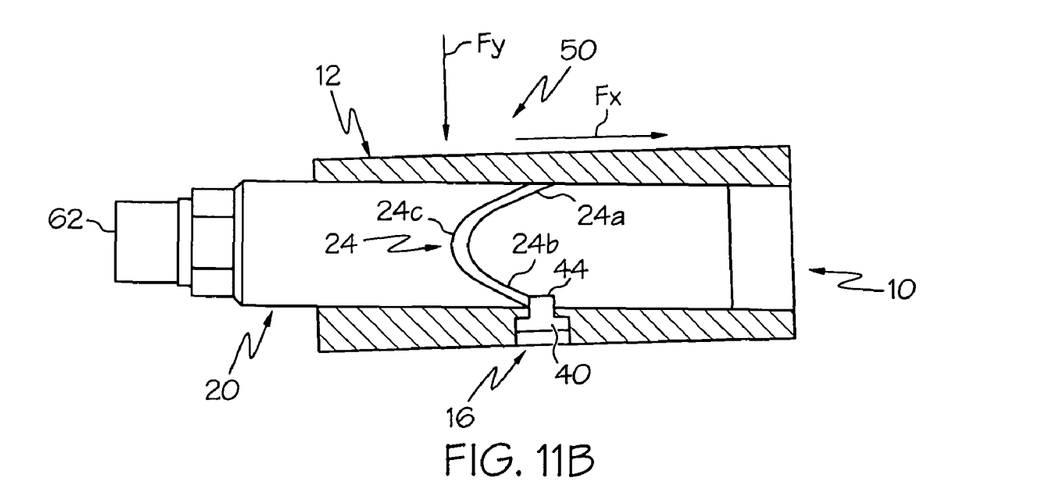
FIG. 11B is a schematic partial sectional view of the pedal apparatus, wherein the axle and the pedal member are oriented in a partially laterally extended position with respect to one another.
Figure 11C:
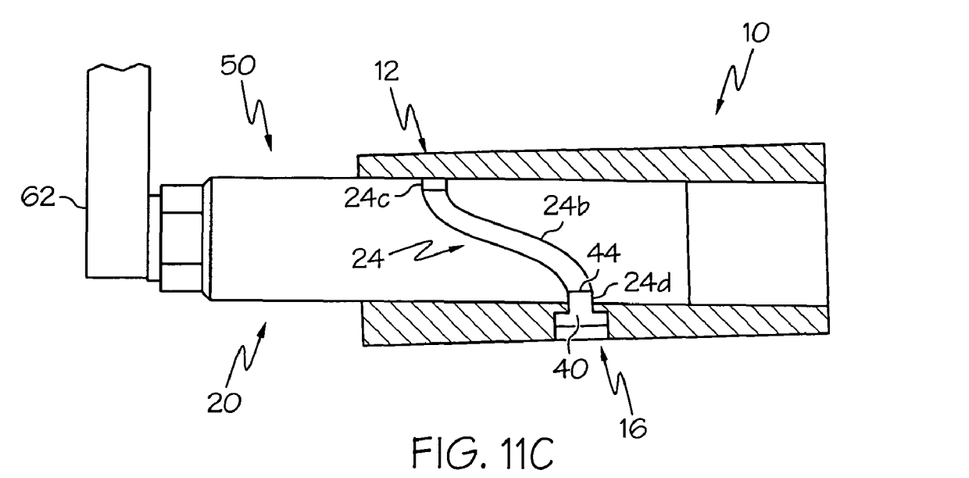
FIG. 11C is a schematic partial sectional view of the pedal apparatus, wherein the axle and the pedal member are oriented in a fully laterally extended position with respect to one another.

FIG. 11B is a schematic sectional view of the pedal apparatus 50 in position 11B in FIG. 11. In this example, the axle 20 and the pedal member 10 are oriented in a partially extended position with respect to one another. Indeed, as the cam extension 44 follows within the cam groove 24, the pedal member 10 in this example begins to move in the direction of the lateral side force $F_x$ to cause partial translation of the pedal member 10 with respect to the axle 20. Further application of the downward vertical force $F_y$ and a lateral side force $F_x$ causes further rotation of the pedal apparatus 50 to rotate along direction 52b from position 11B to position 11C shown in FIG. 11.

FIG. 11C is a schematic sectional view of the pedal apparatus 50 in position 11C in FIG. 11. In this example, the axle 20 and the pedal member 10 are oriented in a fully extended position with respect to one another. Indeed, as the cam extension 44 follows with the cam groove 24, the pedal member 10 in this example is caused to fully extend in a translational direction with respect to the axle 20.

Figure 11D:
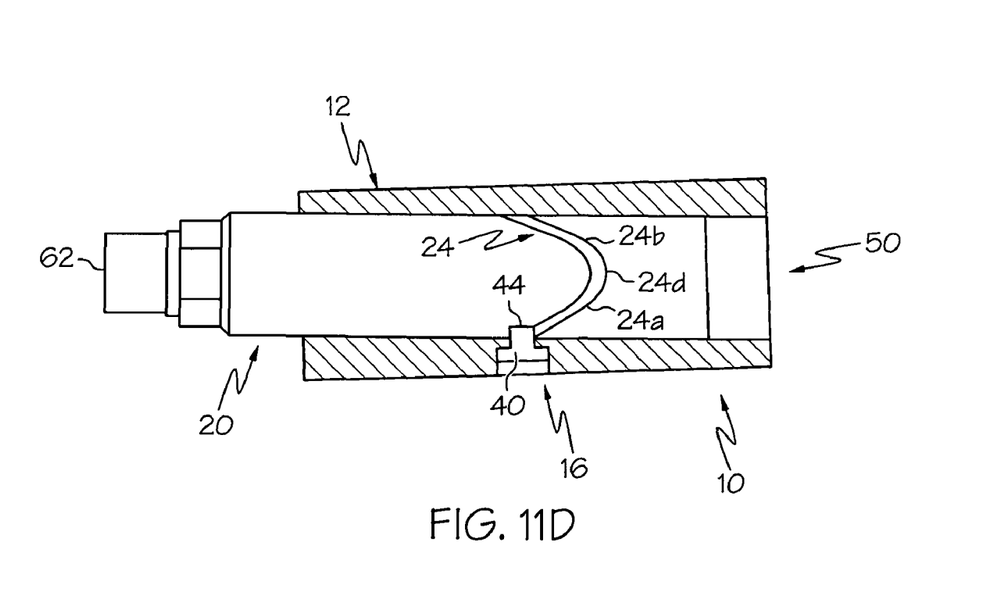
FIG. 11D is a schematic partial sectional view of the pedal apparatus, wherein the axle and the pedal member are oriented in a partially laterally retracted position with respect to one another.

Once positioned as shown in FIG. 11C, the rider's opposite leg (not shown) can then be used to apply downward vertical and lateral side forces to the opposite pedal apparatus (not shown) in a similar manner to cause further rotation of the drive apparatus 60 such that the pedal apparatus 50 is rotated along direction 52c from position 11C to position 11D in FIG. 11. FIG. 11D is a schematic sectional view of the pedal apparatus 50 in position 11D in FIG. 11, wherein the axle 20 and the pedal member 10 are oriented in a partially retracted position with respect to one another. Further application of force by the rider's opposite leg (not shown) can further apply downward vertical and lateral side forces to the opposite pedal apparatus (not shown) to further rotate the drive apparatus 60 such that the pedal apparatus 50 is rotated along direction 52d from position 11D back to the position 11A in FIG. 11. The pedal apparatus 50 can then be engaged again, as described above, to cause further rotation of the pedal apparatus 50 in direction 52a. In further examples, the pedal member 10 may be provided with a cage, clip, strap, and/or other configuration designed to grasp the foot, shoe, hand, and/or glove of a user. In such examples, both legs/arms may be used simultaneously to work respective crank shafts. For example, each leg/arm can alternatively provide a downward/outward force while the other leg/arm provides an upward/inward force in use. In other examples, the pedal apparatus can work in a manner that the opposite pedal can work as a mirror to the first pedal. In further examples, the pedal apparatus can work in a manner that the opposite pedal can work independently of the first pedal.

The cam groove 24 can include various shapes in accordance with examples of the present invention. Different shapes can be used to control distance and the speed of movement between the axle 20 and the pedal member 10. As shown in FIG. 11A, the cam groove 24 can include a substantially inverted S-shaped portion 24a. As shown in FIG. 11C, the cam groove can also include a substantially S-shaped portion 24b. As shown in FIGS. 11B and 11D, the substantially inverted S-shaped portion 24a and the substantially S-shaped portion 24b can be connected together at respective locations 24c, 24d to form a continuous path. In the illustrated example, the cam groove 24 can be configured to provide a first lateral position, such as a maximum translation, at the end of a stroke of the pedal member 10 (position 11C) while providing a second lateral position, such as a minimum translation, at the beginning of the stroke of the pedal member 10 (position 11A). For example, one stroke of the pedal member can include a minimum translation at the beginning of a stroke, such as when the pedal member is at a top location (position 11A). The end of the stroke can refer to the position 11C of the pedal member 10, when the pedal member 10 is at a lower location. In further examples, the cam groove 24 can be designed so the first lateral position and the second lateral position can occur at different stroke positions.

It will be appreciated, that the pedal apparatus of the present invention allows use of downward and lateral forces against a pedal to cause the pedal to undergo translational movement in use. Such movement may give a rider a skate-like or ski-like feel to the riding motion. Thus the pedal motion can incorporate a skating movement where the legs, or arms, move in a way that is similar to the motion of a skater. The movement is an inside to outside motion, much like a person who is roller-blading or ice-skating. This motion can increase muscle usage through the oblong-like motion and can introduce the use of new or different muscles. Such motion can exercise and use force generated by different muscle groups and may provide benefits to a user's knees, shoulders or other joints when used as foot pedals or hand pedals. The motion involves movement in two planes, such as a lateral plane and a vertical plane.

The motion can begin at the inside position at the top of the cycle, or wherever the beginning of the cycle begins. Then the motion moves outwards anywhere from about 0.25 inches or less to as far out as allowable in the circumference of the circle. On a typical riding bike, this outward motion can move about 2 inches although other distances are possible in further examples. Thus, the distance between the first lateral position and the second lateral position can range from about 0.25 inches to about 2 inches although the difference between first and second lateral positions may be less than 0.25 inches and/or greater than 2 inches in further examples. The outer most distance away from the starting position can be at the bottom of the cycle (position 11C). As the cycle is completed back to the top or starting position, the motion returns back to its original inside position. The motion can be caused by a cam with a platform that can be angled anywhere from 1° to as far as 30° although no angle, negative angles or other angle positions may be provided in further examples. Still further, the platform may be rotatable such that the angle is not fixed, or may be flexed within a limited range of angles.

Figure 12A:
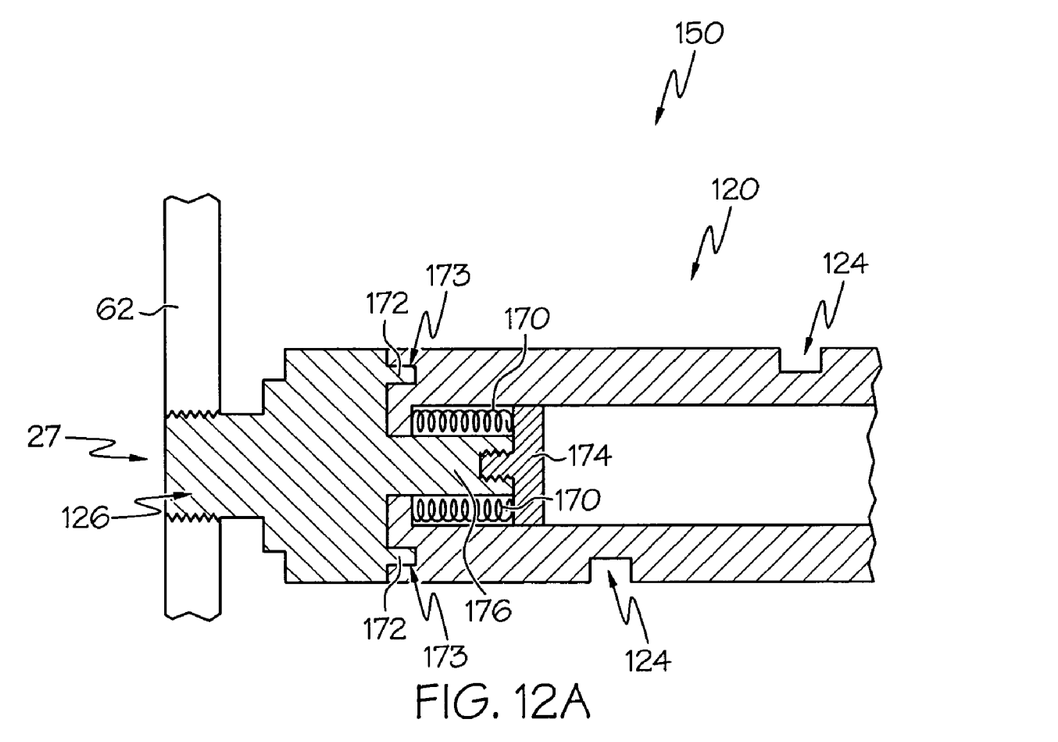
FIG. 12A is a schematic sectional view of portions of another example pedal apparatus in accordance with aspects of the present invention.
Figure 12B:
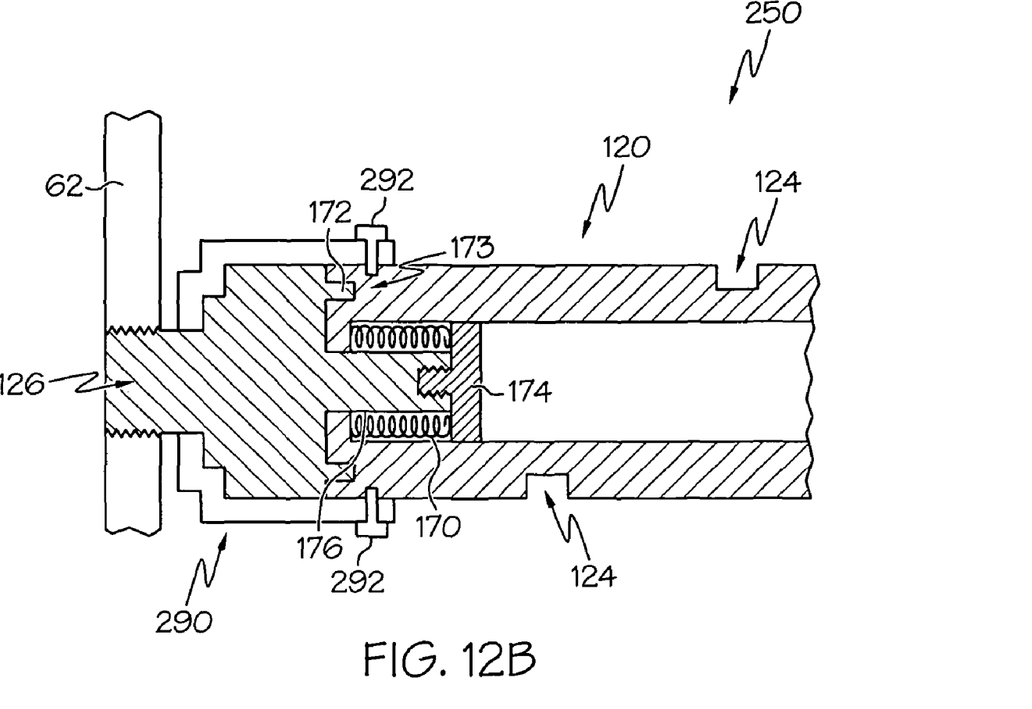
FIG. 12B is a schematic sectional view of portions of another example pedal apparatus in accordance with aspects of the present invention.
Figure 12C:
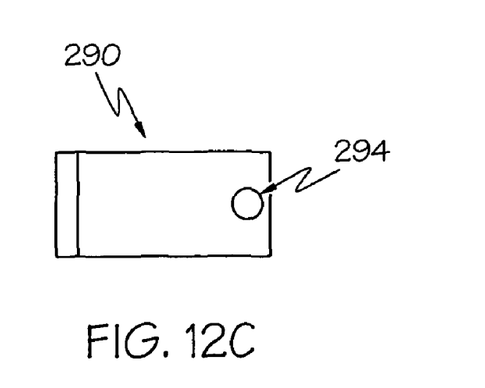
FIG. 12C is a top view of an example locking device.

FIGS. 12A-12C and 13A-13D show further examples of portions of pedal apparatus 150, 250 in accordance with aspects of the present invention. In each pedal apparatus 150, 250, an angular position between the mounting device 126 and the axle 120 being adjustable to a selected angular position. The mounting device 126 and the axle 120 can, for example, be adjustable by the use of a lever, by the use of screwing or dialing the axle 120 to a desired position, or by the use of a clamping device to secure the position of the axle 120 relative to the mounting device 126. The mounting device 126 and the axle 120 can also be biased to a selected angularly locked position, as shown in the examples of FIGS. 12A-12C. The bias allows the mounting device 126 and the axle 120 to be biased to a selected position. The mounting device 126 can include at least one biasing device 170 that is operably connected to the axle 120 wherein the biasing device 170 is configured to bias the mounting device 126 and the axle 120 into a selected angularly locked position. The biasing device 170 in this example is a spring though in other examples, other biasing devices can be used.

In another example, the mounting device 126 can also include at least one locking tongue 172. The pedal member 10 can have a plurality of locking grooves 173 to selectively receive the at least one locking tongue 172 of the mounting device 126 into the axle 120. Alternatively, the at least one locking tongue 172 can be located on the pedal member 10 and the plurality of locking grooves 173 can be located on the mounting device 126. There can also be a plurality of locking tongues 172 in further examples.

In a further example, a biasing device 170 can be configured to bias the locking tongue 172 into the locking groove 173 of the mounting device such that the mounting device 126 and the axle 120 are biased to a selected angularly locked position. In the example of FIG. 12A, the mounting device 126 can further include an assembly structure 174 that is configured to engage the mounting device 126 and the biasing device 170. The mounting device 126 can include an extended portion 176 that engages the assembly structure 174.

In the example of FIG. 12B, a biasing device 170 is also provided. This example further includes an optional locking device 290 that can be provided to prevent inadvertent disengagement of the mounting device 126 and the axle 120 from the selected angularly locked position. The locking device 290 can be slidingly fit around the mounting device 126 and the axle 120. The locking device 290 can include at least one locking aperture 294 (as seen in FIG. 12C) that is configured to receive at least one fastener 292 (as seen in FIG. 12B). The fasteners 292 are configured to secure the position of the axle 120 with respect to the mounting device 126. Other types of fasteners can be used and other structure can be provided to prevent inadvertent disengagement of the axle 120 from the mounting device 126.

Figure 13A:
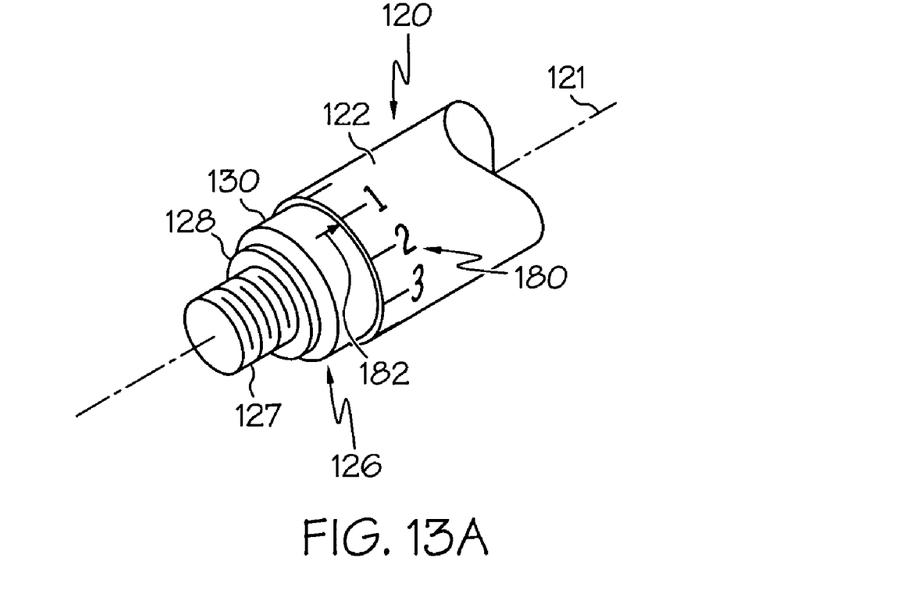
FIG. 13A is an upper front perspective view of an example mounting device and axle biased to a selected angularly locked position.

FIGS. 13A-13D show an example of selecting an angular position of the mounting device 126 and the axle 120. As shown in FIG. 13A, the mounting device 126 is shown with the axle 120 locked in a first selected angular position. In this example, the axle 120 also includes optional indicia 180 that are configured for setting or calibrating the pedal member 10 to a specific lateral position. For example, indicia, such as markings numbered 1 through 8, can be provided along the surface of the axle 120. In other examples, the indicia can be provided along the surface of the mounting device 126, or nut 130. The indicia can also be other various types of symbols such as shapes, letters, or numbers that indicate an alternative selected angular position. The indicia 180 can be used to ensure that the cam follower 40 located within the aperture 16 is being operably connected to set the pedal member at a specific lateral position. Thus, if a user desires the pedal member to be at a first lateral position with respect to the axle 120 when the pedal member is located at its lowest vertical point of rotation (position 11C), the user can rotate the illustrated axle 120 to select a specific indicia 180. An alignment indicia 182, such as an arrow, can also be provided on one of the mounting device or an end of the axle 120. The alignment indicia 182 is configured to be aligned with one of the plurality of indicia 180 for setting or aligning the pedal member 10 in a desired lateral position. The user can then also set a second pedal member to a translational position, such as a corresponding lateral position or to the same lateral position, as the first pedal member. A user can calibrate the first and/or the second pedal to change the lateral positions of the pedals relative to the axle 120 at each position of the pedal (e.g. 11A, 11B, 11C, 11D) to create different types of motions using different muscles.

Figure 13B:
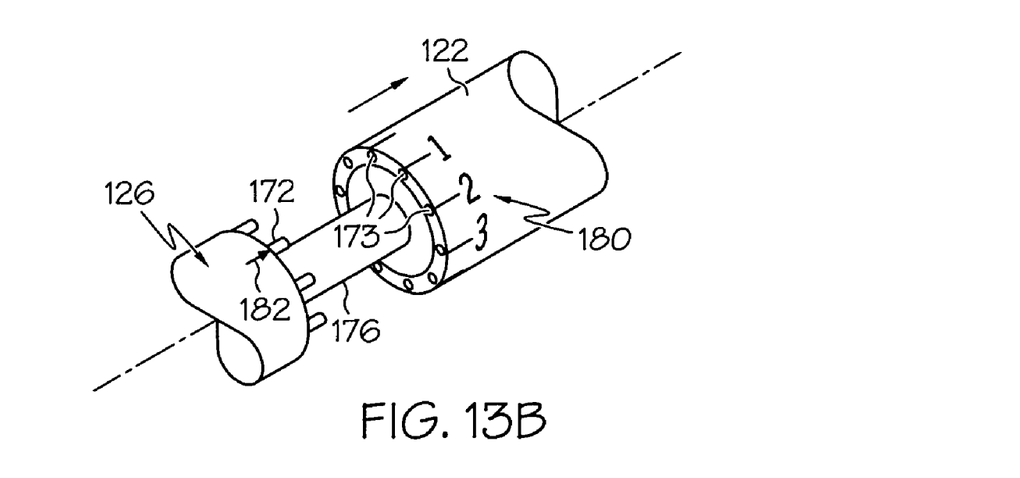
FIG. 13B is an upper front perspective view of the axle being unlocked from the mounting device.
Figure 13C:
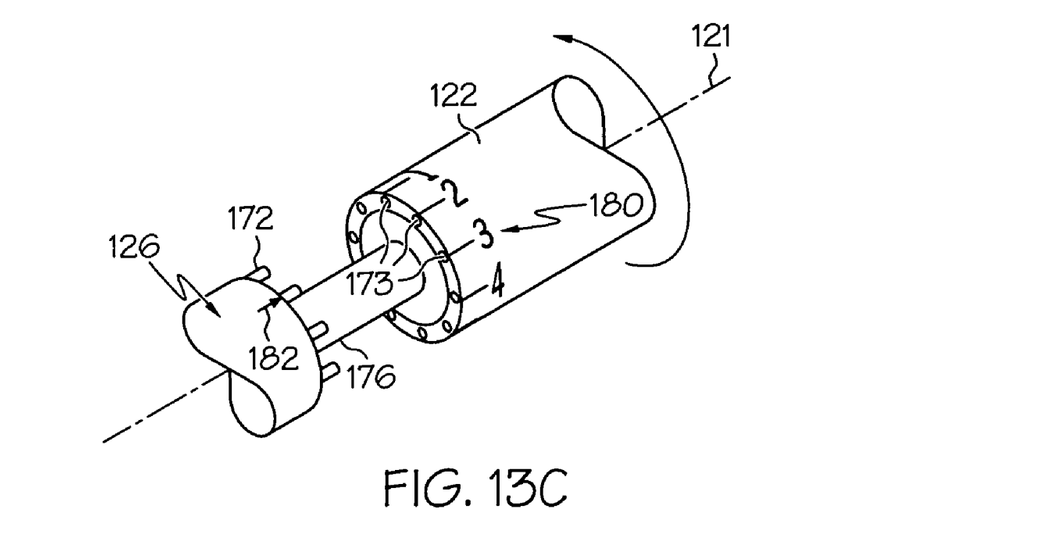
FIG. 13C is an upper front perspective view of the axle being rotated with respect to the mounting device to place the axle in a second selected angular position.
Figure 13D:
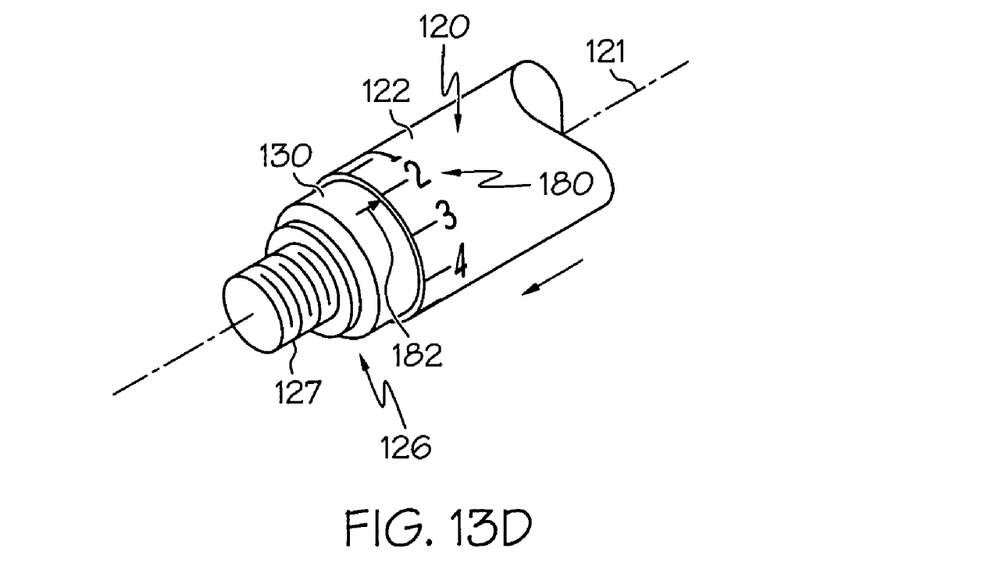
FIG. 13D is an upper front perspective view of the mounting device and axle being biased to be locked in the second selected angular position.

In FIG. 13A, the alignment indicia 182 is set at position 1 of the indicia 180. FIG. 13B shows the next part of the operation of selecting an angularly locked position as the axle 120 is pulled away from the mounting device 126. It is appreciated that FIG. 13B is not to scale, and that the length of the extended portion 176 of the mounting device 126 that is visible may be different in various examples. The extended portion 176 of the mounting device 126 can be provided with or without the pedal apparatus 150, 250 including a biasing device 170. Once the axle 120 is pulled away from the mounting device 126, a plurality of locking tongues 172 can be seen unlocked from a corresponding number of a plurality of locking grooves 173. It is appreciated that while this example shows a plurality of locking tongues 172, a singular locking tongue 172 with a plurality of locking grooves 173 can also be provided. The axle 120 is then rotated, as seen in FIG. 13C to reach a selected angularly locked position. In this example, the axle 120 is rotated to position 2, as shown by the indicia 180. The axle 120 is then released or pushed back into engagement with the mounting device 126, as seen in FIG. 13D. The alignment indicia 182 in this example shows the new selected angularly locked position as position 2 of the indicia 180. It is appreciated that any position can be chosen and that no indicia are needed to select a position. It is also appreciated that the example of FIGS. 13A-13D can also include the mounting device 126 and the axle 120 being biased to a selected angularly locked position. A locking device can optionally be provided to prevent inadvertent disengagement of the mounting device and the axle from the selected angularly locked position. For example, if the locking device 290 shown as FIG. 12B is provided, fasteners 292 can be engaged with corresponding locking apertures 294 to prevent disengagement of the selected locked position.

The invention has been described with reference to the example embodiments described above. Modifications and alterations will occur to others upon a reading and understanding of this specification. Example embodiments incorporating one or more aspects of the invention are intended to include all such modifications and alterations.

What is claimed is:

1. A pedal apparatus (250) configured to be attached to a threaded aperture of a crank shaft (62) of a drive apparatus (60), the pedal apparatus (260) comprising:

a pedal member (10) including a bore (14), and a threaded aperture (16); and an axle (120) extending into the bore (14) to support the pedal member (10), the axle (120) comprising a hollow interior area extending along an axis of the axle (120), a plurality of locking grooves (173) extending in a direction of the axis of the axle (120), and a cam groove (24);

a cam follower (40) including a threaded base (42) and a cam extension (44), wherein the threaded base (42) is threadedly received in the threaded aperture (16) of the pedal member (10) with the cam extension (44) being received within the cam groove (24) of the axle (120), wherein a rotation of the pedal member (10) with respect to the axle (120) causes translation of the pedal member (10) with respect to the axle (120) along the axis of the axle (120);

a mounting device (126) coupled to the axle such that the axle may be selectively shifted relative to the mounting device in the direction of the axis of the axle (120), the mounting device comprising a threaded shank including a threaded end (27) configured to be threaded into the threaded aperture of the crank shaft (62), the mounting device further including a plurality of locking tongues (172) extending in the direction of the axis of the axle (120), the mounting device (126) further including a central portion (176) extending in the direction of the axis into the hollow interior area of the axle (120) and an assembly structure (174) engaging the central portion (176) and positioned within the hollow interior area of the axle (120);

a spring (170) positioned within the hollow interior area of the axle (120), wherein the spring engages the assembly structure (174) and the axle (120) to selectively bias each of the locking tongues (172) into a selected one of each of the locking grooves (173) to selectively lock an angular position between the mounting device and the axle, wherein an angular position between the mounting device and the axle is adjustable by translating the axle (120) in the direction of the axis of the axle (120) to unlock the locking tongues (172) from the respective locking grooves (173), rotating the axle (120) to an adjusted angular position with respect to the mounting device (126), and then biasing each of the locking tongues (172) with the spring (170) into another selected one of each of the locking grooves (173) to selectively lock the mounting device (126) in the adjusted angular position relative to the axle (120); and a locking device (290) provided with a plurality of fasteners (292) engaging corresponding locking apertures (294) of the locking device (290) to prevent inadvertent translation of the axle (120) relative to the mounting device (126) in the direction of the axis of the axle (120) from the selected angularly locked position.

* * * * *